UNITED STATES PATENT OFFICE.

NATHAN SULZBERGER, OF NEW YORK, N. Y.

CHLORAL DERIVATIVES CONTAINING THE RADICAL OF A FATTY ACID.

1,025,889. Specification of Letters Patent. Patented May 7, 1912.

No Drawing. Application filed April 20, 1909. Serial No. 491,162.

*To all whom it may concern:*

Be it known that I, NATHAN SULZBERGER, a citizen of the United States of America, residing at No. 34 West Seventy-first street, New York city, in the county of New York and State of New York, have invented new and useful Improvements in Chloral Derivatives Containing the Radical of a Fatty Acid, of which the following is a specification.

My invention relates to new compounds containing chloral in combination with the amids and derivatives and mixtures of same with fatty acids containing more than twelve atoms of carbon and derivatives and mixtures of same. These compounds are tasteless and odorless, readily split up, especially with caustic alkalis, nonvolatile and non-hygroscopic. They can be dissolved in fats, oils, etc., of mineral, vegetable and animal origin and be used in such shape especially as ointments, salves, soaps, etc., for the skin. Into such ointments, etc., other chemicals of pharmaceutical action may be mixed. These new compounds are made by dissolving the amid or mixtures, or derivatives of such amid or mixture of derivatives of such amids in chloral—best used in excess. On distilling off the excess of chloral or freeing the formed compound in some other way from such excess of chloral, the new bodies are obtained. They may be recrystallized from alcohol, etc., if further purification is desired. The general formula of these compounds is the following:

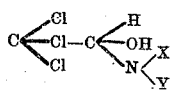

where "X" stands for the radical of a fatty acid, having more than twelve atoms of carbon or a derivative of such acid, and "Y" stands for hydrogen or an alkyl- or aryl-group, which latter new compounds containing an alkyl- or aryl-group are obtained, if instead of the fatty acid amid, a fatty acid amid was used, one of whose atoms of hydrogen of the amido group, had been replaced by an aryl- or alkyl-group, as for instance, when using the ethyl-amid of stearic acid. While for lack of a suitable generic term including both an alkyl- and an aryl-group as well as hydrogen I have limited the claims to products containing an alkyl group, I nevertheless consider as equivalents thereof products containing such an aryl group as well as products containing hydrogen in place of the alkyl group. As a sample of one of these compounds, I give the following formula, made by dissolving alpha-bromstearic acid anilid in chloral:

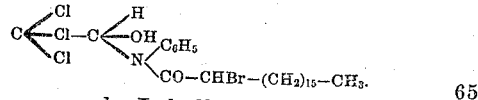

As an example, I shall describe the preparation of the new chloral derivative with the amid of palmitic acid.

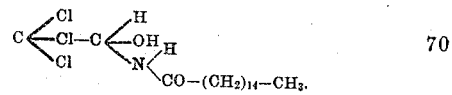

The amid of palmitic acid—made by dropping palmitic acid chlorid into strong ammonia or prepared in any other way—is dissolved with gentle heat in somewhat more than one molecular proportion of chloral, 18 grams for instance of the amid may be dissolved in about 12 grams (about 10 gr. theory) of chloral. Gradually the temperature is raised to about 100 degrees C. The light yellow liquid while yet warm and in an oily condition is poured into water and thus freed from the excess of chloral. The new compound separates out immediately in hard white lumps which are freed from the water and may be recrystallized from dilute alcohol.

The pure product—chloral-palmitic acid amid—is a white crystalline powder of fatty feel, tasteless and odorless, non-hygroscopic, soluble in alcohol, etc., and fats and oils. It can be kept indefinitely without changing and melts at 110 degrees C. A determination of nitrogen showed it to have the composition above written (0.1935 grams of the new compound contained (at 17 degrees and 770 mm.) 5.6 ccm. nitrogen or 3.39%, while the theory demands 3.49%.)

Commercial fatty acids—as for instance such are obtained by saponifying animal and vegetable fats and oils—may be used in making these compounds. Lanolin, paraffin, vaseline, benzoinated lard, etc., can be used in making salves, etc. Other chemicals of desirable pharmaceutical action may be mixed in.

I claim:

1. As new compositions of matter, the herein described compounds of chloral with amids of fatty acids, such acids containing more than twelve atoms of carbon, having the following general formula:

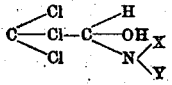

where "X" stands for the radical of a fatty acid, having more than twelve atoms of carbon and "Y" stands for the alkyl group, such compounds being insoluble in water and not volatile without decomposition.

2. As a new composition of matter the chloral-palmitic-acid amid being a white crystalline powder of fatty feel, not volatile, melting at about 110 degrees C., and soluble in alcohol and having the following structural formula:

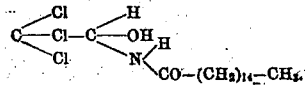

NATHAN SULZBERGER.

Witnesses:
R. CHRISTIANSEN,
LEWIS E. BIRDSEY.

---

Copies of this patent may be obtained for five cents each, by addressing the "Commissioner of Patents, Washington, D. C."